United States Patent [19]

Iijima

[11] Patent Number: 4,800,520
[45] Date of Patent: Jan. 24, 1989

[54] PORTABLE ELECTRONIC DEVICE WITH GARBAGE COLLECTION FUNCTION

[75] Inventor: Yasuo Iijima, Yokohama, Japan

[73] Assignee: Kabushiki Kaisha Toshiba, Kawasaki, Japan

[21] Appl. No.: 922,465

[22] Filed: Oct. 23, 1986

[30] Foreign Application Priority Data

Oct. 29, 1985 [JP] Japan ................ 60-242213
Nov. 30, 1985 [JP] Japan ................ 60-269625

[51] Int. Cl.$^4$ .............. G06F 12/16; G06K 5/00; G06K 7/01
[52] U.S. Cl. ................... 364/900; 235/380; 235/382; 235/382.5
[58] Field of Search ............... 235/375, 379, 380, 381, 235/382, 382.5, 441; 364/200 MS File, 900 MS File

[56] References Cited

U.S. PATENT DOCUMENTS

| | | | |
|---|---|---|---|
| 4,339,820 | 7/1982 | Stockburger | 235/382 |
| 4,375,032 | 2/1983 | Uchida | 235/380 |
| 4,510,382 | 4/1985 | Walter | 235/380 |
| 4,544,833 | 10/1985 | Ugon | 235/379 |
| 4,572,946 | 2/1986 | Schrenk | 235/380 |
| 4,614,861 | 9/1986 | Pavlov et al. | 235/380 |
| 4,616,126 | 10/1986 | Yanagawa et al. | 235/375 |
| 4,650,981 | 3/1987 | Foletta | 235/380 |
| 4,667,088 | 5/1987 | Kramer et al. | 235/380 |
| 4,672,182 | 6/1987 | Hirokawa | 235/375 |
| 4,683,372 | 7/1987 | Matsumoto | 235/380 |
| 4,755,660 | 7/1988 | Nakano | 235/380 |

*Primary Examiner*—Thomas M. Heckler
*Assistant Examiner*—Joseph T. Fitzgerald
*Attorney, Agent, or Firm*—Cushman, Darby & Cushman

[57] ABSTRACT

A portable electronic device of this invention has a control CPU (Central Processing Unit) and a data memory. The data memory is divided into a plurality of areas, and each area consists of a data area and an attribute area indicating an attribute of the data area. The attribute area consists of a first flag indicating whether or not data is stored in the data area, a second flag indicating whether or not data written in the data area is valid, and a third flag indicating whether or not data written in the data area is stored as a block. When an instruction supplied from a host system is a valid-data rearrangement instruction, the control CPU refers to the second flag, and sets a first flag of a data area whose second flag indicates that data is invalid to indicate that data is unwritten, thus rear-ranging valid data of the data memory so that no invalid data area is present between valid data areas. When the third flag indicates write incompletion, the control CPU sets the second flag to make the data area invalid.

5 Claims, 11 Drawing Sheets

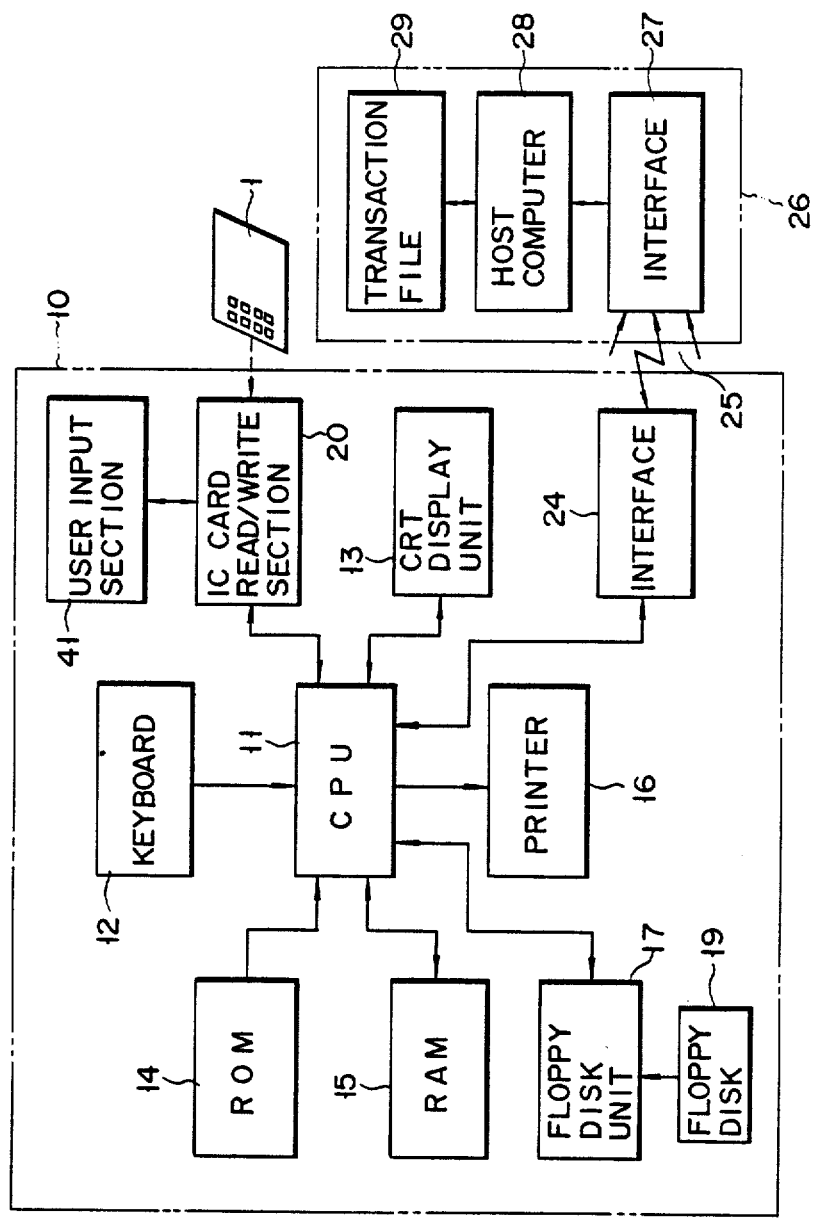
F I G. 2

FIG. 10

| | | |
|---|---|---|
| b1 | VALID | TRANSACTION DATE — a1 |
| b2 | VALID | TRANSACTION AMOUNT — a2 |
| b3 | VALID | TRANSACTION DATE — a3 |
| b4 | VALID | TRANSACTION AMOUNT — a4 |
| b5 | VALID | TRANSACTION DATE — a5 |
| b6 | VALID | TRANSACTION AMOUNT — a6 |
| b7 | VALID | REMAINING BALANCE — a7 |
| b8 | UN-WRITTEN | --- — a8 } UNWRITTEN AREA |

FIG. 9

| | | |
|---|---|---|
| b1 | VALID | TRANSACTION DATE — a1 |
| b2 | VALID | TRANSACTION AMOUNT — a2 |
| b3 | INVALID | REMAINING BALANCE — a3 |
| b4 | VALID | TRANSACTION DATE — a4 |
| b5 | VALID | TRANSACTION AMOUNT — a5 |
| b6 | INVALID | REMAINING BALANCE — a6 |
| b7 | VALID | TRANSACTION DATE — a7 |
| b8 | VALID | TRANSACTION AMOUNT — a8 |
| b9 | VALID | REMAINING BALANCE — a9 |
| b10 | UN-WRITTEN | --- — a10 } UNWRITTEN AREA |

F I G. 11A

| | | |
|---|---|---|
| b1 — VALID | TRANSACTION DATE | a1 |
| b2 — VALID | TRANSACTION AMOUNT | a2 |
| b3 — UNWRITTEN | | a3 |
| b4 — VALID | TRANSACTION DATE | a4 |
| b5 — VALID | TRANSACTION AMOUNT | a5 |
| b6 — UNWRITTEN | | a6 |
| b7 — VALID | TRANSACTION DATE | a7 |
| b8 — VALID | TRANSACTION AMOUNT | a8 |
| b9 — VALID | REMAINING BALANCE | a9 |
| b10 — UNWRITTEN | | a10 |

F I G. 11B

| | | |
|---|---|---|
| b1 — VALID | TRANSACTION DATE | a1 |
| b2 — VALID | TRANSACTION AMOUNT | a2 |
| b3 — VALID | TRANSACTION DATE | a3 |
| b4 — VALID | TRANSACTION DATE | a4 |
| b5 — VALID | TRANSACTION AMOUNT | a5 |
| b6 — UNWRITTEN | | a6 |
| b7 — VALID | TRANSACTION DATE | a7 |
| b8 — VALID | TRANSACTION AMOUNT | a8 |
| b9 — VALID | REMAINING BALANCE | a9 |
| b10 — UNWRITTEN | | a10 |

F I G. 11C

| | | |
|---|---|---|
| b1 — VALID | TRANSACTION DATE | a1 |
| b2 — VALID | TRANSACTION AMOUNT | a2 |
| b3 — VALID | TRANSACTION DATE | a3 |
| b4 — UNWRITTEN | | a4 |
| b5 — VALID | TRANSACTION AMOUNT | a5 |
| b6 — UNWRITTEN | | a6 |
| b7 — VALID | TRANSACTION DATE | a7 |
| b8 — VALID | TRANSACTION AMOUNT | a8 |
| b9 — VALID | REMAINING BALANCE | a9 |
| b10 — UNWRITTEN | | a10 |

F I G. 13
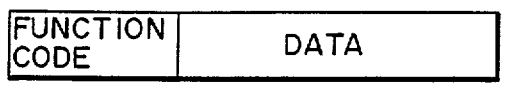
F I G. 14
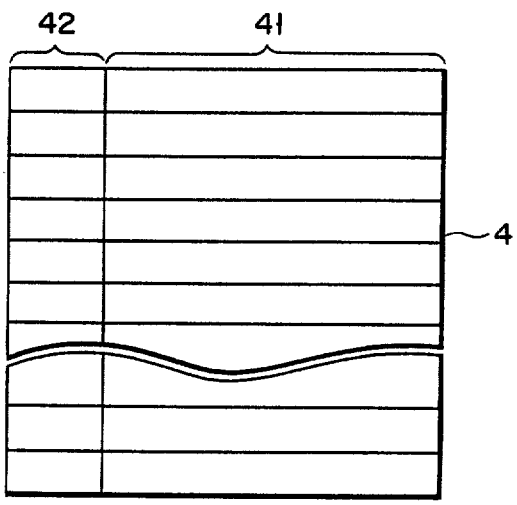
F I G. 15
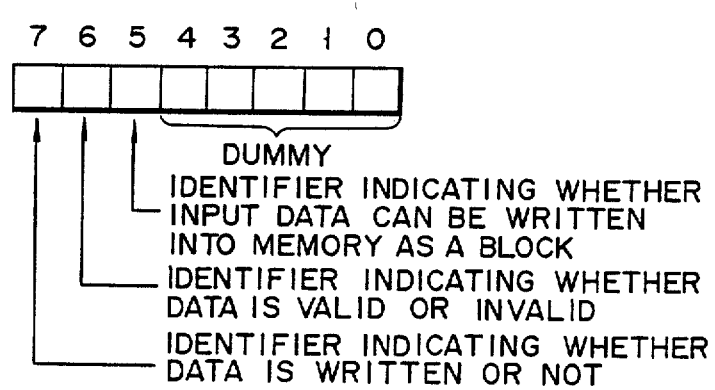

4,800,520

PORTABLE ELECTRONIC DEVICE WITH GARBAGE COLLECTION FUNCTION

BACKGROUND OF THE INVENTION

The present invention relates to a portable medium, such as an IC card, for incorporating, e.g., a CPU, data memory, and the like.

In recent years, an IC card has been developed as a memory card for storing data and is commercially available. The IC card incorporates a CPU (Central Processing Unit), a data memory comprising an EPROM, and the like. However, since the conventional IC card adopts the EPROM as a memory element, data once written in the memory cannot be rewritten or erased. For this reason, unnecessary data cannot be erased. In order to solve this, unnecessary data is made invalid so as not to be accessed externally.

Another conventional IC card adopts an electrically rewritable EEPROM as a memory element to allow unnecessary data to be erased. However, if invalid data is simply selected and erased, both valid data and erased areas are present in the memory. When new data is stored, data indicating which erased area is used must be stored. More specifically, the memory access sequence may be changed.

In a system using an IC card of this type, data exchange with the IC card is performed using a card reader/writer. When the IC card receives instruction data with a function code, it executes a function and outputs the execution result to the card reader/writer as response data. When a data string input to the IC card is written in a data memory, the data string is stored in units of blocks, and read/write access is made taking in units of blocks. However, during storage of a series of data blocks, when a block cannot be constituted for some reason, if the uncompleted storage data is left uncorrected, another data string is written thereafter, and the uncompleted storage data cannot be recognized as a correct block.

SUMMARY OF THE INVENTION

It is an object of the present invention to provide a portable electronic device which can maintain a storage area for new data and in which a data read/write sequence after invalid data is erased (unwritten state) need not be changed.

It is another object of the present invention to provide a portable electronic device wherein, when a data string having an arbitrary data length is written in a data memory, no contradiction occurs in the subsequent read/write access in units of blocks, and data reliability can be greatly improved.

In order to achieve the above object of the present invention, there is provided a portable electronic device comprising:

a control central processing unit (CPU); and memory means which is divided into a plurality of data areas, the data areas storing transaction data and attribute data indicating a storage state, and the attrobite data area storing status data consisting of a first flag indicating whether data is written or unwritten in each data area and a second flag indicating whether data in each data area is valid or invalid, whereby when new transaction data supplied from a host system connected to the portable electronic device is stored, the control CPU refers to the first flags, stores the new transaction data in a data area corresponding to the first flag indicating that data is unwritten, sets the corresponding second flag to indicate that the newly stored data is valid, and sets a second flag corresponding to unnecessary data of previously stored data to indicate that the corresponding data is invalid, and when a valid-data rearranging instruction is supplied from the host system, the control CPU refers to the memory means, sets the first flag of data whose second flag indicates that data is invalid to indicate that data is unwritten in a corresponding data area, and rearranges valid data in the memory means so that no invalid data area is present between valid data areas.

BRIEF DESCRIPTION OF THE DRAWINGS

Other objects and features of the present invention will be apparent from the following description taken in connection with the accompanied drawings, in which:

FIG. 2 is a perspective view showing the outer appearance of the card manipulator shown in FIG. 1;

FIGS. 9,, 10, and 11A through 11C are memory maps showing storage states of a data memory shown in FIG. 4;

FIG. 13 is a format of write instruction data in another embodiment of the present invention;

FIG. 14 is a memory map showing areas of a data memory according to another embodiment of the present invention;

FIG. 15 is a bit format of attribute data shown in FIG. 14; and

DETAILED DESCRIPTION OF THE PREFERRED EMBODIMENTS

An embodiment of the present invention will be described hereinafter with reference to the accompanying drawings.

Figure 1:
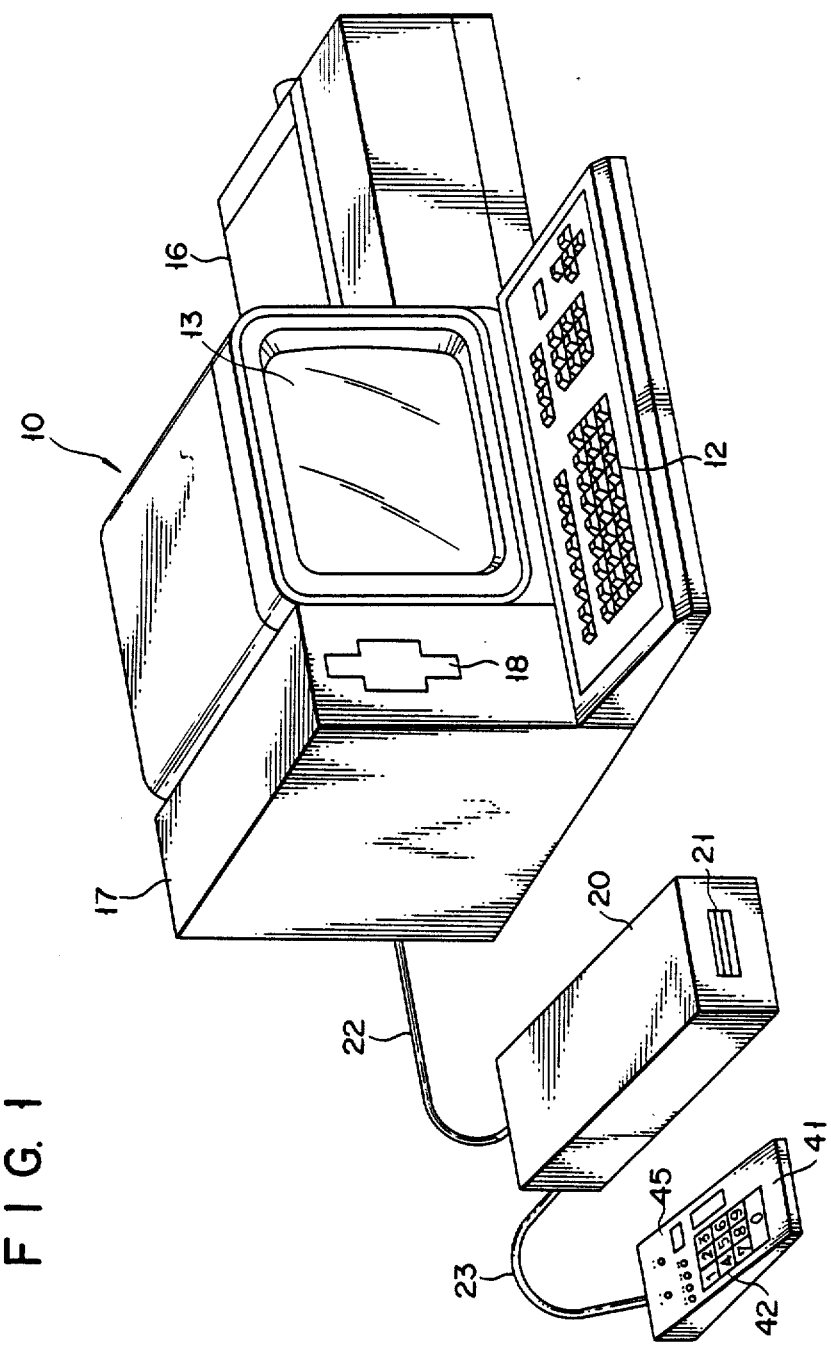
FIG. 1 is a perspective view showing the outer appearance of a card manipulator which performs read/write access with respect to a portable electronic device of the present invention.

FIGS. 1 and 2 show the arrangement of IC card manipulator 10 as a terminal device of the present invention in a home banking system. IC card manipulator 10 is installed in, e.g., a store. More specifically, reference numeral 11 denotes a CPU (Central Processing Unit); 12, a keyboard for inputting data; 13, a CRT display unit; 14, a ROM (Read-Only Memory) storing a control program; 15, a RAM (Random Access Memory) for storing data; 16, a dot printer for outputting various print data; 17, a floppy disk unit for storing and reproducing data in and from floppy disk 19 inserted from floppy disk insertion port 18; 20, IC card read/write section for reading out or storing data in a memory in card 1 inserted from card insertion port 21; 24, an interface for connecting CPU 11 to central processing device 26 in an on-line manner through line 25; and 41, a user input section to which a user inputs a personal identification number (PIN) and the like. IC card read/write section 20 and user input section 41 are used by the user, and other sections are operated by the store. Central processing device 26 comprises interface 27 for controlling data transfer, host computer 28 for controlling data processing, and transaction file 29 for filing transaction data.

Figure 3:
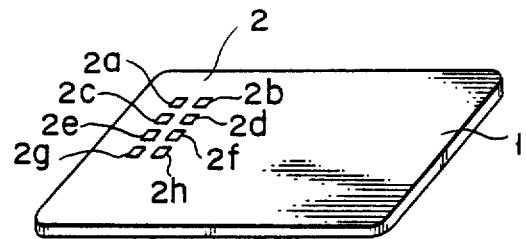
FIG. 3 is a schematic system constructive view showing the outer appearance of an IC card as an embodiment of a portable electronic device according to the present invention.

IC card 1 has connector section 2 on its surface, as shown in FIG. 3, and section 2 is constituted by a plurality of terminals 2a through 2h. Terminal 2a is used as an operating power source (±5 V) terminal; 2b, a ground terminal; 2c, a clock signal terminal; 2d, a reset signal terminal; 2e through 2g, data input/output terminals; and 2h, a data write power source (+21 V) terminal.

Figure 4:
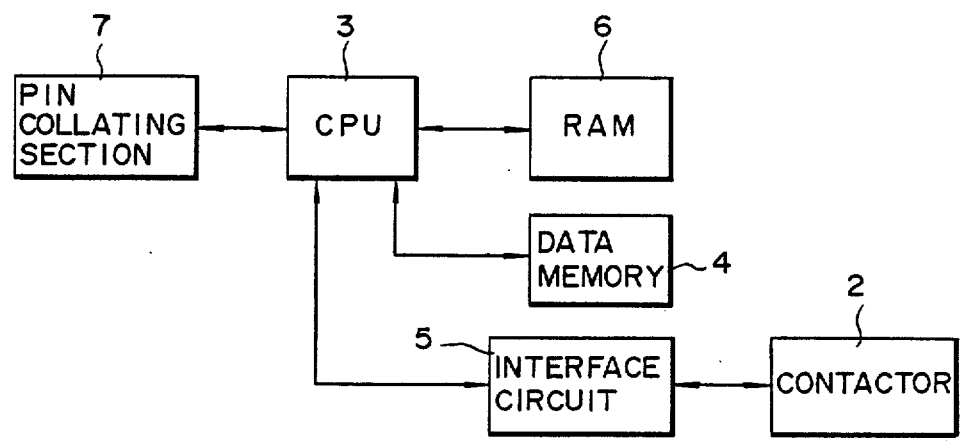
FIG. 4 is a schematic block diagram showing a circuit arrangement of the IC card shown in FIG. 3.
Figure 5:
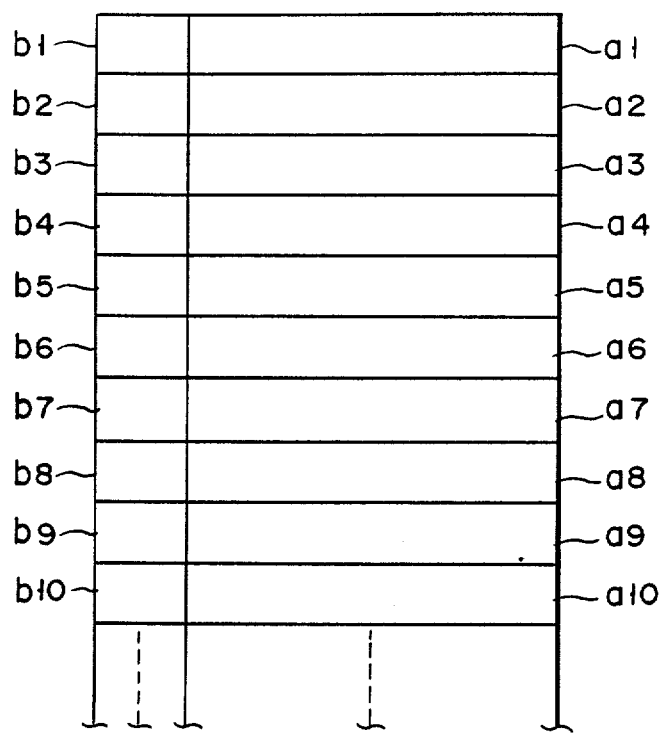
FIG. 5 is a format of a data memory shown in FIG. 4.

As shown in FIG. 4, IC card 1 incorporates control CPU (Central Processing Unit) 3, data memory 4 storing a control program, a personal identification number (e.g., four digits), and transaction data and comprising an EEPROM, interface circuit 5, data processing RAM 6, and PIN collating section 7. The respective components are constituted by IC chips, and are arranged on a single circuit board. Interface circuit 5 and connector section 2 are connected through wirings. PIN collating section 7 collates whether or not an externally supplied personal identification number coincides with a personal identification number stored in data memory 4. The data storage area of data memory 4 is divided into a plurality of data areas a1, a2, ..., as shown in FIG. 5, and data areas a1, a2, ..., store data in units of words. As storage data, a transaction date, a transaction amount, and a remaining balance are stored for each transaction, for example. The starting byte (1 byte) of each of areas a1, a2, ..., stores attribute data b1, b2, ... indicating a storage status.

Figure 6:
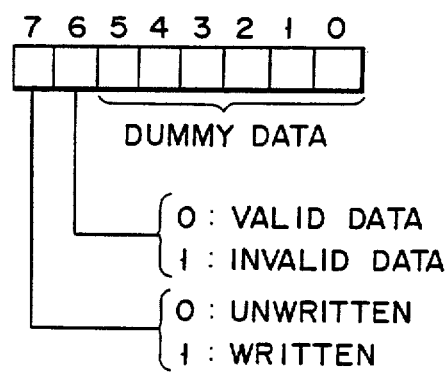
FIG. 6 is a bit format of status data shown in FIG. 5.
Figure 7:
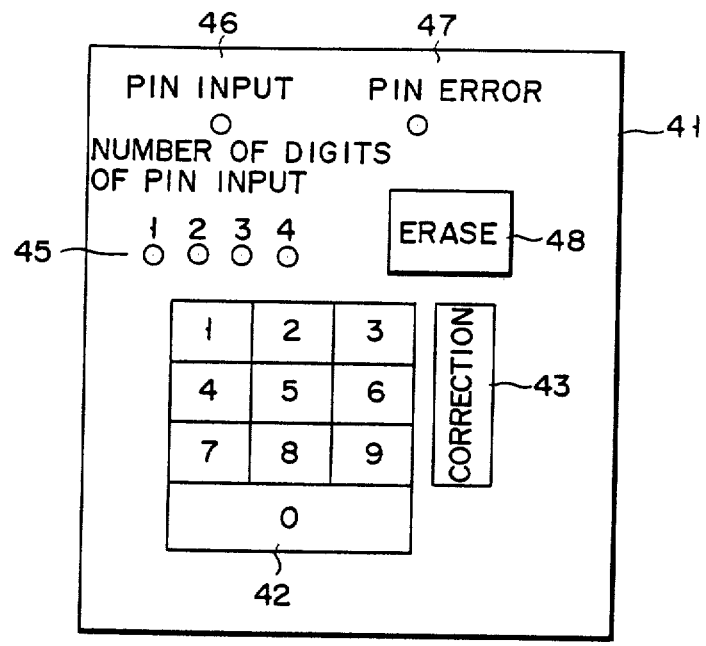
FIG. 7 is a plan view showing the arrangement of a user input section shown in FIG. 2.

Attribute data b1, b2, ..., have an 8-bit configuration, as shown in FIG. 6. Data (or flag) indicating whether or not valid data is written in the corresponding data area, i.e., data indicating that data is written (stored) or unwritten (unstored) is stored in the seventh bit. Data (indication data) indicating whether data in the corresponding data area is valid or invalid, i.e., data (flag) indicating whether or not valid data is erased, is stored in the sixth bit. Dummy data is stored in the fifth through zero bits. For example, if data "0" is set in the seventh bit, this indicates that data is unwritten, and if data "1" is set, this indicates that data is already written in this data area. If data "0" is set in the sixth bit, this indicates valid data, and if data "1" is set, this indicates invalid data. IC card 1 outputs single response data in response to single instruction data supplied from manipulator 10.

User input section 41 comprises ten keys 42 for inputting PIN data, correction key 43 which is depressed for correcting PIN data during its input, indicators 45 for indicating the input number of digits of PIN input, PIN input indicator 46 for acknowledging PIN input, PIN error indicator 47 for signaling a PIN error, and erase key 48 for erasing invalid data in data memory 4 in IC card 1. Section 41 is connected to IC card read/write section 20 through cable 23. Indicators 45 consist of, e.g., four LEDs.

Figure 8:
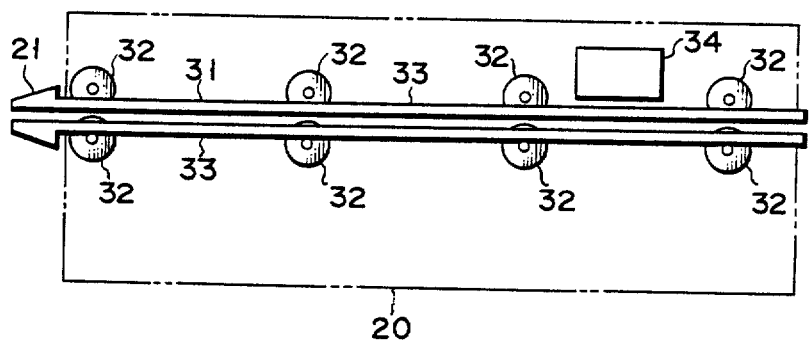
FIG. 8 is a sectional view showing the arrangement of an IC card read/write section shown in FIG. 2.

Section 20 is connected to manipulator 10 through cable 22. More specifically, as shown in FIG. 8, section 20 comprises convey path 31 for conveying card 1 inserted from card insertion port 21. A plurality of pairs of convey rollers 32 are arranged along path 31 to vertically sandwich card 1 when it is conveyed. The pairs of convey rollers 32 are provided at equal intervals along path 31. A distance from the center of each convey roller 32 to the center of an adjacent convey roller 32 corresponds to the width of card 1 in the convey direction. Therefore, path 31 for card 1 is defined by convey guide 33. Reader/writer 34 for performing data communication with CPU 3 of card 1 is arranged above guide 33. Reader/writer 34 is electrically connected to connector section 2.

The operation of the embodiment with the above arrangement will now be described. Assume that a user inserts IC card 1 in card insertion port 21 of card manipulator 10. Card 1 is then electrically connected to reader/writer 34 through connector section 2. CPU 11 then causes CRT display unit 13 to display a message "input PIN". In response to this message, the user inputs his PIN using ten keys 42. CPU 11 illuminates the LEDs of indicators 45 corresponding to the input digits in accordance with the PIN input. The user can certify the digits of the input PIN with reference to indicators 45. After the user inputs the PIN, a signal corresponding to the input PIN and a signal indicating a manipulator are supplied to CPU 3. CPU 3 stores the user's PIN in RAM 6. CPU 3 causes PIN collating section 7 to collate the number of digits and contents of the PIN stored in RAM 6 and that stored in data memory 4. If a coincidence is found therebetween, section 7 supplies a coincidence signal to CPU 3, and if no coincidence is found, it supplies noncoincidence signal to CPU 3.

When the collating result from section 7 indicates a coincidence, CPU 3 outputs a coincidence signal to CPU 11, and if the noncoincidence signal is supplied from section 7, CPU 3 causes noncoincidence counter (not shown) to count up. When the count value of the counter is within a predetermined number (for example, 3 times), CPU 3 sends noncoincidence signal allowing a re-input operation to CPU 11. However, when the count value has reached the predetermined number, CPU 3 sends a noncoincidence signal indicating that card 1 is invalid to CPU 11. As a result, when CPU 11 receives the noncoincidence signal, it determines that a re-input operation of the PIN and a transaction using manipulator 10 cannot be made, and signals it to the user.

If CPU 11 receives the coincidence signal, it determines that a transaction using manipulator 10, i.e., transaction with central processing device 26 is allowed, and causes unit 13 to display a message "input transaction data". Along with this message, a store clerk inputs transaction data, i.e., a transaction date, a type of transaction, and a transaction amount using keyboard 12. CPU 11 outputs the transaction data to host computer 28 through interface 24, line 25, and interface 27. Host computer 28 updates the contents of the corresponding account in transaction file 29 in response to the supplied transaction data.

Upon completion of the transaction, CPU 11 outputs transaction data as a transaction result, i.e., a transaction date, a transaction amount, and a remaining balance, to CPU 3. CPU 3 stores the transaction data in data memory 4. More specifically, CPU 3 checks attribute data b1, b2, ... of data areas a1, a2, ... for their final addresses to determine the last word, and sequentially stores the transaction date, the transaction amount, and the remaining balance from an address next to the last word. For example, CPU 3 stores the transaction date, the transaction amount, and the remaining balance, and sets a flag in the seventh bit of the attribute data corresponding to the above data, thus indicating that valid data is stored. CPU 3 judges that the previous remaining balance is invalid data, and sets a flag in the sixth bit of the attribute data corresponding thereto, thus indicating that this data becomes invalid data. Thereafter, CPU 11 exhausts card 1. In this case, the transaction data is stored in data memory 4, as shown in FIG. 9, and attribute data indicating validity is also stored.

Figure 12A:
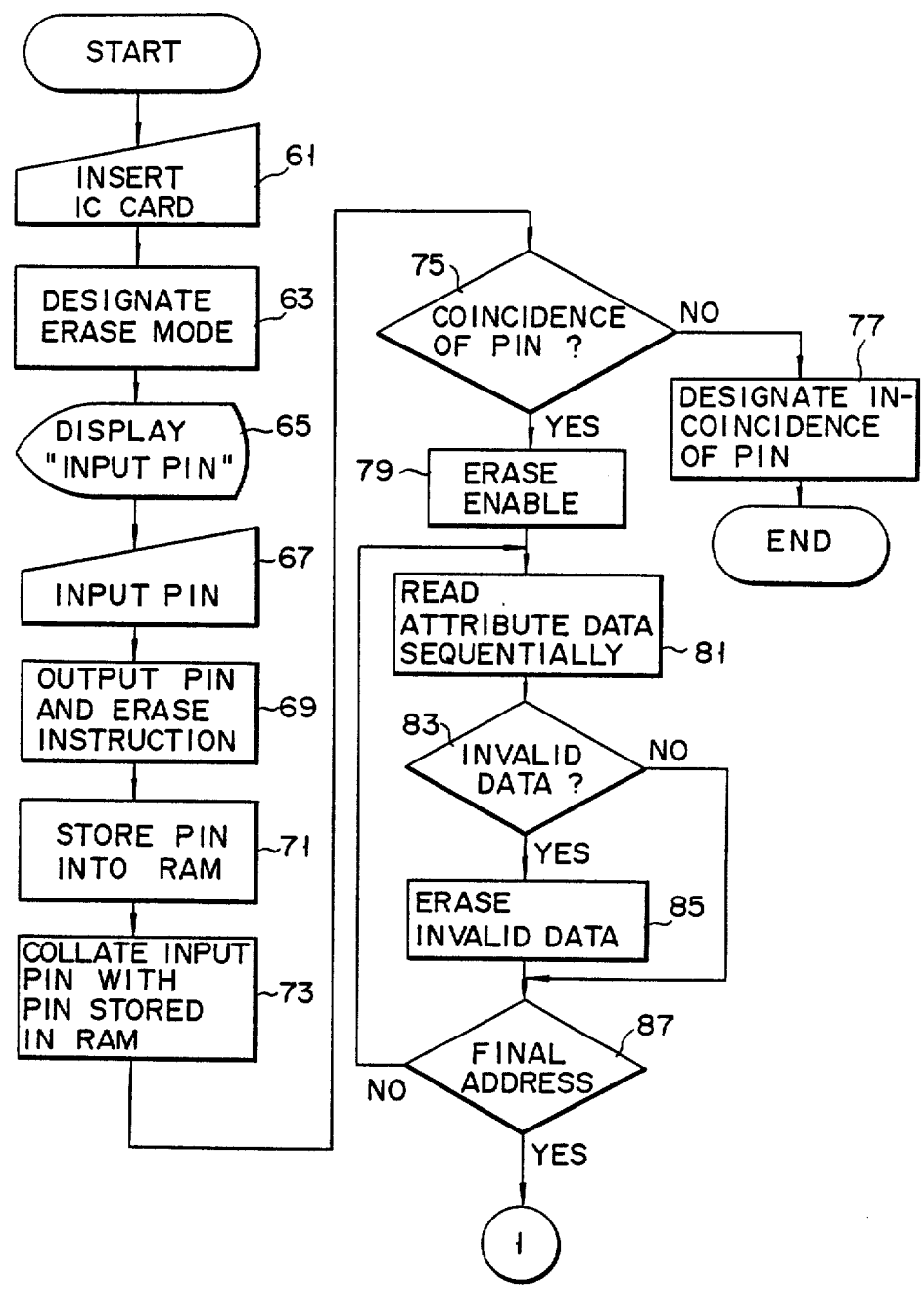
FIGS. 12A and 12B are flow charts for explaining the operation of the embodiment of the present invention.
Figure 12B:
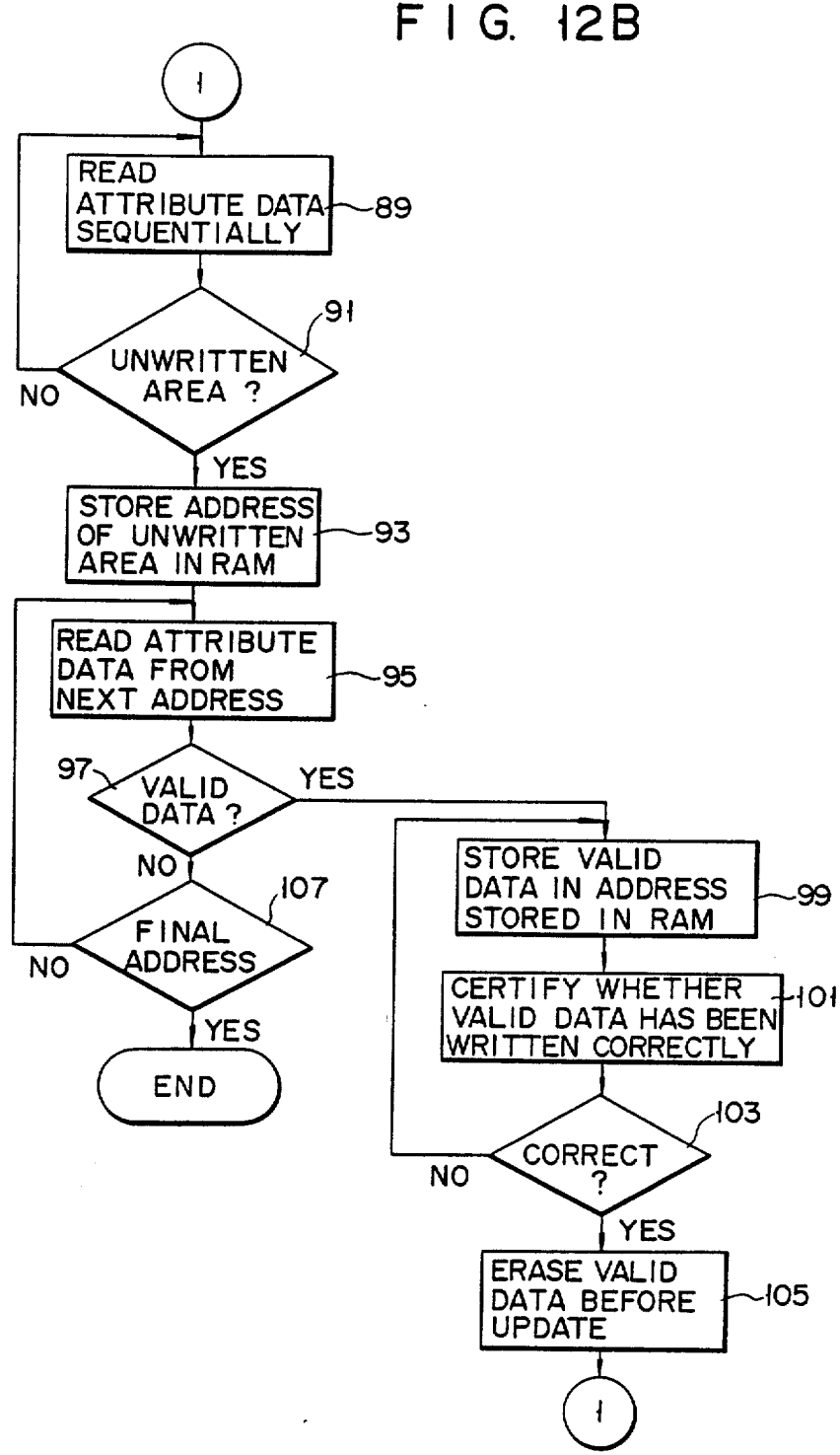

A case will be described with reference to the flow charts shown in FIGS. 12A and 12B wherein the user erases invalid data (unwritten state) since memory 4 of card 1 is full. The user inserts card 1 in card insertion port 21 of manipulator 10 (step 61). Card 1 is then electrically connected to reader/writer 34 through connector section 2. The user designates an erase mode using erase key 48 (step 63). CPU 11 causes display unit 13 to display a message "input PIN" (step 65). In response to this message, the user inputs his PIN using ten keys 42 (step 67). CPU 11 illuminates the LEDs of indicators 45 corresponding to the input digits in accordance with the PIN input. The user can thereby certify the number of digits of the input PIN. After the user inputs the PIN, a signal corresponding to the input PIN and a signal indicating an erase instruction and a manipulator are supplied from CPU 11 to CPU 3 (step 69). CPU 3 stores the PIN of the user in RAM 6 (step 71). CPU 3 then causes PIN collating section 7 to collate the number of digits and the content of the PIN stored in RAM 6 and that stored in data memory 4 (step 73). When a coincidence is found therebetween, section 7 outputs a coincidence signal to CPU 3, and if no coincidence is found between the numbers of digits or contents, it outputs a noncoincidence signal to CPU 3 (step 75).

When the collating result from section 7 is the noncoincidence signal, CPU 3 causes a noncoincidence counter (not shown) in memory 4 to count up. When the count value of the counter is within a predetermined number (for example, 3 times), CPU 3 outputs a noncoincidence signal indicating that a PIN re-input operation is allowed, to CPU 11. However, when the count value of the counter has reached the predetermined value, CPU 3 outputs a noncoincidence signal indicating that card 1 is invalid, to CPU 11. As a result, when CPU 11 receives the noncoincidence signal, it determines that the PIN re-input operation and a transaction using the manipulator cannot be made, and signals it to the user (step 77).

When CPU 3 receives the coincidence signal from section 7, it judges that invalid data in card 1 can be erased (unwritten state) (step 79). CPU 3 sequentially reads out attribute data b1, b2, . . . , from data areas a1, a2, . . . of memory 4 (step 81), and if the flag is set in the sixth bit of the attribute data in any data area, it judges that the corresponding data is invalid data (step 83). From this judgment, CPU 3 erases the contents of data areas a1, a2, . . . which are judged as invalid data and initializes the attribute data, i.e., sets data "0" in the sixth and seventh bits of these data areas (step 85). CPU 3 performs this invalid data erase operation from the start address to the final address (step 87). After step 87, the data areas storing valid data are preset at random, i.e., the areas of valid data and erased areas of invalid data are preset at random.

CPU 3 sequentially reads out status data from data area a1 corresponding to the start address of memory 4 (step 89), and judges unwritten areas in which no flag is set in the seventh bit of the attribute data (step 91). From the judging result, the address of data area a1 (a2, . . . ) which is judged to be an unwritten area is stored in RAM 6 (step 93). CPU 3 sequentially reads out the attribute data from the data area at the next address (step 95) and checks if data therein is valid data in the attribute data of which the flag is set in the seventh bit and no flag is set in the sixth bit (step 97). If valid data is found, CPU 3 reads out the valid data, and stores it in data area a1 (a2, . . . ) at the address stored in RAM 6 (step 99). At this time, CPU 3 sets the flag in the seventh bit of the corresponding attribute data. CPU 3 checks if the valid data is normally stored (steps 101 and 103). If the data is not normally stored, the valid data is restored (step 99). If the data is normally stored, CPU 3 erases the valid data in the source data area before being updated (step 105).

For example, a data rearrangement operation will be described when data unwritten (i.e., erased) areas a3 and a6 are present, as shown in FIG. 11A. More specifically, CPU 3 reads out attribute data b1, b2, . . . from data area a1 corresponding to the start address of memory 4 (step 89), and searches unwritten areas in attribute data b1, . . . of which no flag is set in the seventh bit (step 91). As a result, CPU 3 judges that data area a3 is an unwritten area and stores its address in RAM 6 (step 93). CPU 3 then reads out attribute data b1, . . . from data area a4 at the next address (step 95), and checks if data therein is valid data in which the flag is set in the seventh bit of attribute data b1, . . . and no flag is set in the sixth bit (step 97).

Then, CPU 3 judges that valid data is stored in data area a4, and reads out the valid data to store the valid data in data area a4 in data area a3 at the address stored in RAM 6, as shown in FIG. 11B (step 99). At this time, the flag is set in the seventh bit of attribute data b3 of data area a3. CPU 3 checks if the valid data is normally stored in data area a3 (steps 101 and 103). If the data is abnormally stored, the valid data of data area a4 is stored again in data area a3 (step 99). If the data is normally stored, the valid data in data area a4 before being updated is erased, as shown in FIG. 11C (step 105). As a means for checking if data is normally stored, for example, a check sum of transaction data is calculated or transaction data is exclusively ORed. When it is subjected to read or write access together with transaction data, the check sum of the transaction data is again calculated or the transaction data is exclusively ORed to be compared with the written data. This technique is known to those skilled in the art, and a detailed description thereof is omitted.

Thereafter, an unwritten area from which data is erased is similarly searched from the start address, and the valid data stored in areas after the unwritten area, is stored in the unwritten area. After the data is stored, the content of the source area in which the valid data is stored before being updated is erased. When the operation from steps 89 through 105 is performed up to the final address of memory 4, CPU 3 judges completion of erasing (step 107) and outputs data indicating it to CPU 11. CPU 11 displays a message indicating the end of processing, and exhausts card 1 from port 21. As a result, in memory 4, written areas and unwritten areas can be separated, as shown in FIG. 10, and processing can be performed in accordance with the same sequence before the data rearrangement operation, as in FIG. 9.

If no invalid data is found in step 83, CPU 3 signals this to CPU 11. CPU 11 displays a message indicating that no erasing operation is performed since no invalid data is present.

As described above, unnecessary invalid data in data memory 4 can be erased, and only the valid data is rearranged. A storage area for new data can be kept, and a read/write sequence after the invalid data is erased need not be updated. During rearrangement of valid data, valid data in the source area before being updated is erased after the valid data is normally stored in another area. Even if the valid data cannot be normally rewritten due to power off or write error, the valid data will not be erroneously erased, resulting in high security. Also, since invalid data is erased after the PINs are collated, data security will not be lost.

In the above embodiment, the invalid data erase operation for the data memory, i.e., the data rearrangement operation, is instructed upon key input by the user, but it can be performed each time the IC card is used. When a PIN which specifies a person who can instruct the erase operation is stored in the data memory, the data rearrangement operation by the data erase operation can be performed only when this PIN is input.

In the above embodiment, once invalid data is erased, the valid data is sorted. However, if a flag indicating an unwritten area is set in an area in which invalid data is stored (unwritten state) to indicate the unwritten area, valid data immediately thereafter can be overwritten thereon.

Another embodiment of the present invention will now be described with reference to FIGS. 13 through 16.

A data write operation of IC card 1 will be described with reference to the flow chart shown in FIG. 16. IC card 1 receives write instruction data shown in FIG. 13 from read/write section 20. The write instruction data consists of a write function code and write data. Note that the write function code includes two types of codes. One type of the function code is used when the data amount added thereto is too small and cannot be written as a block (i.e., write incompletion function code). The other type of the function code is used when the data amount added thereto is sufficient and can be written as a block (i.e., write completion function code). Note that the number of bytes for write data is predetermined.

Assume that a portable electronic device is arranged so that data memory 4 is divided in every five bytes. In the case, the 5-byte data is used as one block, and the attribute data is added to the block to write data. However, if 10-byte data is written when the first 5-byte data is sent from read/write section 20 to card 1, the write function code is a write incompletion write function code. On the other hand, when the remaining 5-byte data is set to card 1, the write function code is a write completion function code.

Data memory 4, e.g., an EPROM, is constituted by data storage areas 41 for storing data, and attribute data storage areas 42 for storing attribute data added to the data, as shown in FIG. 14. Each area 42 has a 1-byte configuration. Attribute data has an 8-bit configuration, as shown in FIG. 15. More specifically, the seventh bit of the attribute data is an identifier indicating whether or not data is written. If data "1" is set in the seventh bit, this indicates that data is not written, and if data "0" is set, this indicates that data is written in the area. The sixth bit of the attribute data is an identifier indicating whether or not written data in the area is valid or invalid. If data "1" is set in the sixth bit, this indicates that the data is valid, and if data "0" is set, this indicates that data is invalid. The fifth bit is an identifier indicating whether or not the written data can be written into memory 4 as a block. If data "1" is set in the fifth bit, this indicates incompletion data, and if data "0" is set, this indicates completion data. Note that the zero to fourth bits are dummy bits. In an initial state of the EPROM, these bits are set to be all "1".

Figure 16:
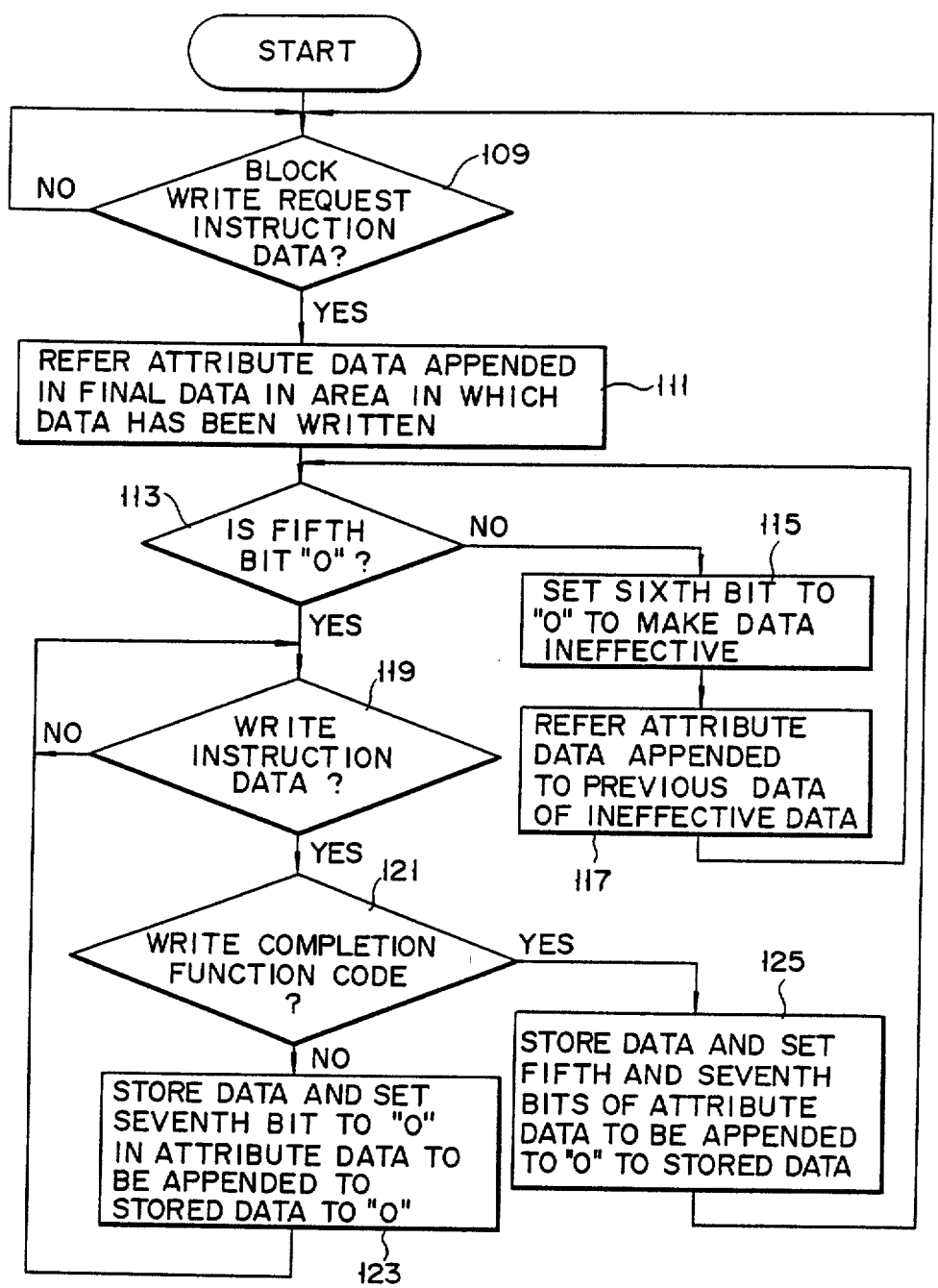
FIG. 16 is a flow chart for explaining a data write operation in another embodiment of the present invention.

Referring nos to FIG. 16, when given block data is written in EPROM 4, block write request instruction data is sent from section 20 to card 1 (step 109). When CPU 3 detects the instruction data, it refers to the seventh bits of attribute data storage areas in areas 42 of EPROM 4 to search the starting unwritten area in step 111. In step 113, CPU 3 refers to the fifth bit of the attribute data storage area of an area immediately before the found unwritten area. If data "0" is set in the fifth bit, since this indicates that the data before the unwritten area is stored as a block, CPU 3 awaits write instruction data in step 119. However, if it is detected in step 113 that data "1" is set in the fifth bit, since this indicates that data which must be completed as a block is not completed, data "0" is set in the sixth bit of the attribute data storage area to make the data storage area corresponding to this attribute data storage area invalid in step 115. Thereafter, in step 117, CPU 3 refers to the attribute data storage area of a data storage area immediately before the invalid data storage area, and the operation from steps 113 through 117 is repeated.

Then, IC card 1 awaits the write instruction data. In this state, when CPU 3 receives the write instruction data from section 20, it refers to a function code included in the instruction data to check if it is a write completion function code or a write incompletion function code in step 121. If the code is the write incompletion function code, CPU 3 writes write data included in the instruction command in EPROM 4, and sets data "0" in the seventh bit of attribute data to be added thereto in step 123, thus awaiting the next write instruction code. However, if the function code included in the instruction data is the write completion function code, CPU 3 similarly writes write data included in the instruction data in EPROM 4, sets data "0" in the seventh and fifth bits of the attribute data added thereto in step 125, and then awaits the next block write request instruction data.

With the arrangement described above, when data is written in the data memory, even if a power source is turned off and data cannot be stored as a block, data which cannot complete a block can be made invalid, and the subsequent data access in units of blocks can be made smoothly. Thus, data reliability in the IC card can be greatly improved.

In the above embodiment, since an electrically unerasable memory element, e.g., an EPROM is used as a data memory, data is made invalid using identifiers. However, when an electrically erasable memory element, e.g., an EEPROM is used as a data memory, attribute and data areas can be erased instead of being made invalid.

In the above embodiment, an IC card has been exemplified as a portable electronic device. The shape of the portable electronic device of the present invention is not limited to a card-like shape, but can be a block-like shape or pencil-like shape. The hardware arrangement of the portable electronic device can be modified within the spirit and scope of the invention.

What is claimed is:

1. A portable electronic device comprising:

memory means divided into a plurality of areas, each area storing input data and attribute data of the input data, the attribute data comprising a first flat indicating whether input data has previously been written in the area, and a second flag indicating whether the input data previously stored in the area is deletable;

means for writing input data in the area whose first flag indicates that input data has not been previously written therein;

means for deleting input data in the area whose second flag indicates that input data previously stored therein is deletable;

first changing means for changing the first flag to indicate that input data has been written in the corresponding area or to indicate that input data has not been written in the corresponding area;

second changing means for changing the second flag to indicate that the previously stored input data is deletable in the corresponding area or to indicate that the previously stored input data is not deletable in the corresponding area; and data rearrangement means for copying previously stored input data into another area and deleting the previously stored input data from the area where previously stored in accordance with the corresponding first and second flags for each area, and for causing the first and second flags for each area to be changed by said first and second data changing means to indicate the data rearrangement.

2. A portable electronic device according to claim 1, wherein said attribute data further comprises a third flag indicating whether input data has been written in the corresponding area completely, and said portable electronic device further comprising means for changing the third flag to indicate that the input data has not been completely written in the corresponding area or to indicate that the stored input data designates the completely written input data.

3. A portable electronic device according to claim 2, further comprising means for changing the second flag to indicate that input data for the corresponding area is deletable when the third flag indicates that the input data has not been completely written in the corresponding area.

4. A portable electronic device according to claim 2, further comprising means for deleting input data from the area whose first flag indicates that input data has been written in the area but whose third flag indicates that the input data has not been completely written in the area.

5. A data rearrangement method for a portable electronic device having memory means, comprising:

(a) dividing said memory means into a plurality of areas, each area storing input data and attribute data of the input data, the attribute data comprising a first flag indicating whether input data has previously been written in the area, and a second flag indicating whether the input data previously stored in the area is deletable;

(b) writing input data in the area whose first flag indicates that input data has not been previously written therein, and thereafter, for rewriting the first flag to indicate that input data has been written in the area;

(c) rewriting the second flag to indicate that previously stored input data is deletable when both the previously stored input data is deletable and the corresponding first flag indicates that input data has been written in the area;

(d) sequentially reading the second flag of the attribute data, area by area, for deleting previously stored input data of the area whose second flag indicates that the previously stored input data is deletable, for rewriting the first flag to indicate that input data has not been written in the area, and for storing the address of the location of the area in a predetermined area of said memory means;

(e) sequentially reading the attribute data of the areas located in addresses subsequent to the address stored in the predetermined area of said memory means, for detecting the area whose first flag indicates that input data has previously been written in the area and whose second flag indicates that the previously written input data is not deletable, rewriting the second flag to indicate that the previously written input data is deletable, and for writing the input data previously written into the area into another area designated by the address stored in the predetermined area of said memory means; and (f) repeating steps (d) and (e) until deletable areas are not present between the areas which store written input data which is not deletable.

* * * * *